United States Patent
Nguyen et al.

(10) Patent No.: US 6,698,519 B2
(45) Date of Patent: Mar. 2, 2004

(54) METHODS OF FORMING PERMEABLE SAND SCREENS IN WELL BORES

(75) Inventors: Philip D. Nguyen, Duncan, OK (US); Henry L. Restarick, Carrollton, TX (US); Ronald G. Dusterhoft, Katy, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 97 days.

(21) Appl. No.: 10/053,054

(22) Filed: Jan. 18, 2002

(65) Prior Publication Data

US 2003/0155124 A1 Aug. 21, 2003

(51) Int. Cl.⁷ .............................................. E21B 33/14
(52) U.S. Cl. ................................. 166/294; 166/305.1
(58) Field of Search .......................... 166/281, 283, 166/307, 305.1, 293–295, 207, 227, 236, 177.4

(56) References Cited

U.S. PATENT DOCUMENTS

| | | | |
|---|---|---|---|
| 2,135,909 A | 11/1938 | Monson | 166/21 |
| 2,187,895 A | 1/1940 | Sanders | 166/21 |
| 2,190,989 A | 2/1940 | Johnston | 166/21 |
| 2,193,808 A | 3/1940 | Dieterich | 166/21 |
| 2,257,344 A | 9/1941 | Maloney | |
| 2,288,557 A | 6/1942 | Vollmer | 166/26 |
| 3,044,547 A | 7/1962 | Jarboe, Jr. | 166/12 |
| 3,119,448 A | 1/1964 | Rhoades | 166/12 |
| 3,368,623 A | 2/1968 | Carter et al. | 166/12 |
| 3,605,899 A | 9/1971 | Tate et al. | 166/300 |
| 3,709,298 A * | 1/1973 | Pramann | 166/276 |
| 3,800,847 A * | 4/1974 | Rike | 166/295 |
| 3,816,151 A | 6/1974 | Podlas | 106/194 |
| 3,862,663 A | 1/1975 | Curtice et al. | 166/276 |
| 4,042,032 A | 8/1977 | Anderson et al. | 166/276 |

(List continued on next page.)

FOREIGN PATENT DOCUMENTS

| | | | |
|---|---|---|---|
| EP | 0933498 A1 | 8/1999 | E21B/43/02 |
| EP | 1176126 A2 | 1/2002 | C04B/28/04 |

OTHER PUBLICATIONS

Database WPI, Patent Document No. SU 874990, XP–002239555 published on Oct. 23, 1981 by Derwent Publications Ltd.

*Primary Examiner*—Zakiya Walker
(74) *Attorney, Agent, or Firm*—Robert A. Kent; C. Clark Dougherty, Jr.

(57) ABSTRACT

Methods of forming permeable sand screens in long, open hole well bores within fluid producing zones are provided. The methods basically comprise the steps of placing a perforated pipe in the open hole well bore, providing a hardenable composition which after being placed in a desired location cures into a hard mass, placing the hardenable composition in the well bore adjacent to the fluid producing zone within the interior of the perforated pipe therein, between the perforated pipe and the walls of the open hole well bore and within voids or fractures in the producing zone, causing the hardenable composition to cure into a hard permeable mass and drilling the hard permeable mass out of the interior of the perforated pipe.

37 Claims, 1 Drawing Sheet

U.S. PATENT DOCUMENTS

| | | | |
|---|---|---|---|
| 4,070,865 A | 1/1978 | McLaughlin | 61/36 C |
| 4,074,760 A | 2/1978 | Copeland et al. | 166/276 |
| 4,336,842 A | 6/1982 | Graham et al. | 166/276 |
| 4,829,100 A | 5/1989 | Murphey et al. | 523/131 |
| 5,062,484 A | 11/1991 | Schroeder, Jr. et al. | 166/278 |
| 5,095,987 A * | 3/1992 | Weaver et al. | 166/276 |
| 5,128,390 A | 7/1992 | Murphey et al. | 523/130 |
| 5,339,902 A | 8/1994 | Harris et al. | 166/293 |
| 5,363,916 A | 11/1994 | Himes et al. | 166/276 |
| 5,381,864 A | 1/1995 | Nguyen et al. | 166/280 |
| 5,393,810 A | 2/1995 | Harris et al. | 524/56 |
| 5,529,123 A | 6/1996 | Carpenter et al. | 166/293 |
| 5,609,207 A | 3/1997 | Dewprashad et al. | 166/276 |
| 5,839,510 A | 11/1998 | Weaver et al. | 166/276 |
| 5,921,317 A | 7/1999 | Dewprashad et al. | 166/208 |
| 5,924,488 A | 7/1999 | Nguyen et al. | 166/280 |
| 5,960,880 A | 10/1999 | Nguyen et al. | 166/280 |
| 6,003,600 A | 12/1999 | Nguyen et al. | 166/281 |
| 6,016,870 A | 1/2000 | Dewprashad et al. | 166/295 |
| 6,063,738 A | 5/2000 | Chatterji et al. | 507/269 |
| 6,202,751 B1 | 3/2001 | Chatterji et al. | 166/276 |
| 6,311,773 B1 | 11/2001 | Todd et al. | 166/280 |
| 6,543,545 B1 * | 4/2003 | Chatterji et al. | 166/381 |

* cited by examiner

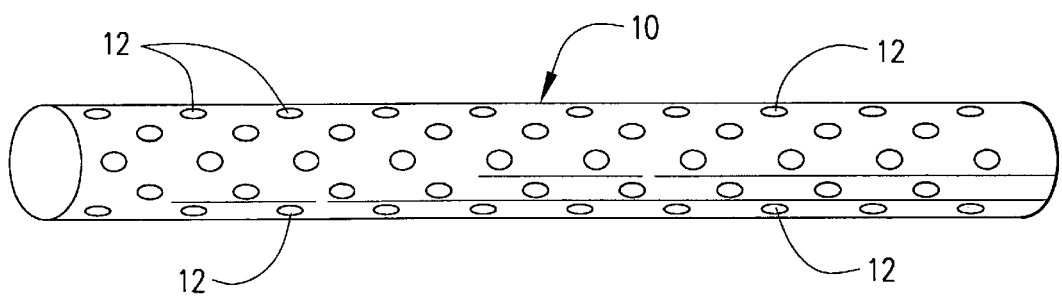
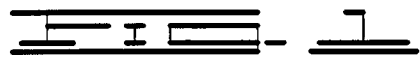
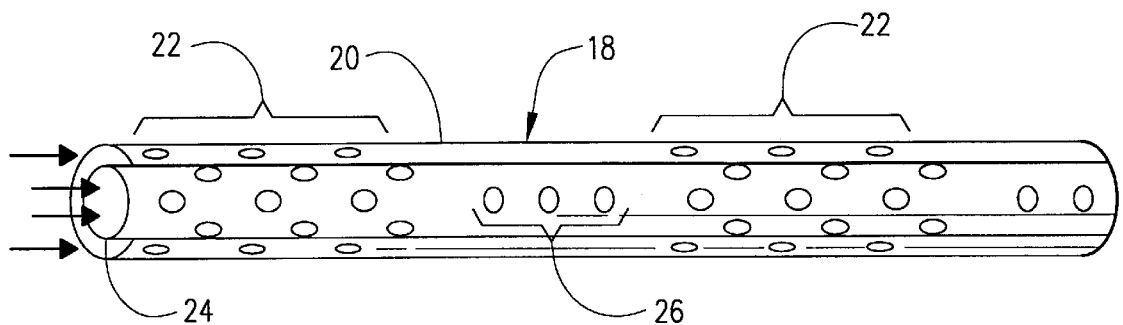
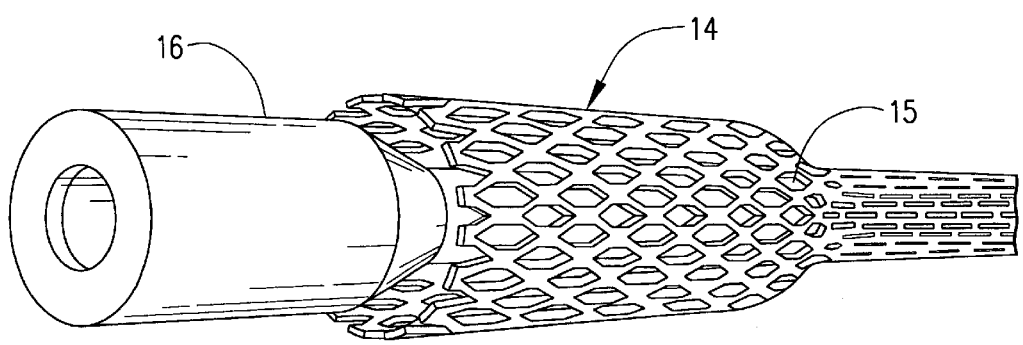
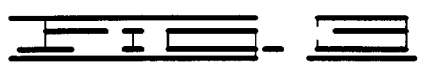

METHODS OF FORMING PERMEABLE SAND SCREENS IN WELL BORES

BACKGROUND OF THE INVENTION

1. Field of the Invention

The present invention provides methods of forming permeable sand screens in well bores to prevent sand from flowing into the well bore with produced hydrocarbons and other fluids.

2. Description of the Prior Art

Oil, gas and water producing wells are often completed in unconsolidated subterranean formations containing loose or incompetent sand which flows into the well bores with produced fluids. The presence of the sand in the produced fluids rapidly erodes metal tubular goods and other production equipment which often substantially increases the costs of operating the wells.

Gravel packs have heretofore been utilized in wells to prevent the production of sand. Such gravel packs are comprised of a pack of gravel such as graded sand which is placed in the annulus between a perforated or slotted liner or screen and the walls of a well bore in the fluid producing zone. The resulting structure provides a barrier to migrating sand from the producing zone while allowing the flow of produced fluids. Gravel packs have successfully prevented the production of sand with formation fluids, but they often fail and require replacement. For example, gravel packs frequently fail due to the deterioration of the perforated or slotted liner or screen as a result of corrosion or the like. The initial installation of a gravel pack adds considerable expense to the cost of completing a well and the removal and replacement of a failed gravel pack is even more costly.

Thus, there are continuing needs for improved methods of preventing the production of formation sand, fines and the like with produced subterranean formation fluids.

SUMMARY OF THE INVENTION

The present invention provides improved methods of forming permeable sand screens in long, open hole well bores within fluid producing zones which meet the needs described above and overcome the deficiencies of the prior art. The methods of the invention are basically comprised of the following steps. A perforated pipe containing a plurality of openings around and along the length thereof is placed in an open hole well bore adjacent to a fluid producing zone. The perforated pipe is of a size such that its external diameter is smaller than the diameter of the open hole well bore. A hardenable composition is provided which after being placed in a desired location cures into a hard permeable mass. The hardenable composition is placed in the well bore adjacent to the fluid producing zone within the interior of the perforated pipe therein, between the perforated pipe and the walls of the open hole well bore and within voids or fractures in the producing zone. Thereafter, the hardenable composition is caused to cure into a hard permeable mass, and the part of the hard permeable mass within the interior of the perforated pipe is drilled out of the pipe.

An alternate embodiment of the present invention is comprised of the following steps. A perforated outer pipe containing groups of openings around the periphery thereof spaced from each other along the length of the pipe and having a smaller drillable perforated inner pipe attached within the outer pipe which includes groups of openings that are longitudinally offset from the groups of openings in the outer pipe is provided. The perforated outer pipe containing the drillable perforated inner pipe is placed in the open hole well bore adjacent to the fluid producing zone. The perforated outer pipe has an external diameter smaller than the diameter of the open hole well bore. A hardenable composition is provided which after being placed in a desired location cures into a hard permeable mass. The hardenable composition is placed in the well bore adjacent to the fluid producing zone within the interior of the drillable perforated inner pipe, between the drillable perforated inner pipe and the perforated outer pipe, between the perforated outer pipe and the walls of the well bore and within voids or fractures in the producing zone. Thereafter, the hardenable composition is caused to cure into a hard permeable mass, and the part of the hard permeable mass within the interior of the perforated outer pipe along with the drillable perforated inner pipe and the hard permeable mass within it are drilled out.

The hardenable composition utilized can be a hydraulic cement composition which includes particles, beads or fibers which are soluble in acids or liquid hydrocarbons. Upon hardening, the cement mass formed is contacted with an acid or a liquid hydrocarbon to thereby dissolve the particles, beads or fibers in the cement composition and permeate it whereby produced hydrocarbons can flow through the permeated cement composition, but loose or incompetent sands cannot. A hydraulic cement composition which includes cross-linked aqueous gel particles containing internal temperature activated breakers which cause the gel particles to break into a liquid can also be utilized as can a hardenable resin coated particulate material which cures into a hard permeable mass.

It is, therefore, a general object of the present invention to provide improved methods of forming permeable sand screens in well bores.

Other and further objects, features and advantages of the present invention will be readily apparent to those skilled in the art upon a reading of the description of preferred embodiments which follows.

DESCRIPTION OF THE DRAWINGS

FIG. 1 is a side view of a perforated pipe containing a plurality of openings around and along the length thereof which can be used in accordance with this invention.

FIG. 2 is a side view of a perforated outer pipe containing groups of openings around the periphery thereof and having a smaller drillable perforated inner pipe attached therewithin which can be used in accordance with this invention.

FIG. 3 is a side view of an expandable slotted pipe which can be expanded to a desired size after being placed in a well bore which can be used in accordance with this invention.

DESCRIPTION OF PREFERRED EMBODIMENTS

In accordance with the methods of this invention, a permeable sand screen is formed in a long, open hole well bore within a fluid producing zone whereby loose and incompetent sand and fines are prevented from entering the well bore with produced fluids. The methods are basically comprised of the following steps. A perforated pipe containing a plurality of openings around and along the length thereof and having an external diameter smaller than the diameter of the open hole well bore is placed in the open hole well bore adjacent to the fluid producing zone therein. A hardenable composition which after being placed in a desired location cures into a hard permeable mass is provided. The hardenable composition is placed in the well bore adjacent to the fluid producing zone within the interior of the perforated pipe therein, between the perforated pipe and the walls of the open hole well bore and within voids or fractures in the producing zone. Thereafter, the hardenable composition is caused to cure into a hard permeable mass, and the hard permeable mass is drilled out of the interior of the perforated pipe.

The hardenable composition utilized in accordance with this invention can be a hardenable cement composition which is caused to cure into a hard permeable mass or a hardenable resin coated particulate material which cures into a hard permeable mass. A cement composition which can be utilized is comprised of a hydraulic cement, water and particles, beads or fibers which are soluble in acids or liquid hydrocarbons. The acid soluble materials that can be utilized for forming the particles, beads or fibers include, but are not limited to, calcium carbonate, magnesium carbonate and zinc carbonate. The hydrocarbon soluble particles, beads or fibers can be formed of gilsonite, naphthalene, asphaltene, polystyrene and oil soluble resin. The acid soluble particles, beads or fibers can be utilized in the cement composition by themselves or in combination with hydrocarbon soluble particles, beads or fibers. The particles, beads or fibers can be used individually or in mixtures of two or more. As will be understood by those skilled in the art, after a cement composition utilized in accordance with the methods of this invention has been placed in the well bore adjacent to the fluid producing zone, caused to cure into a hard mass and the hard mass has been drilled out of the interior of the perforated pipe, the cured cement composition is contacted with an acid solution, with a hydrocarbon or both to thereby dissolve the particles, beads or fibers in the cement composition and permeate the cement composition.

Another hydraulic cement composition which can be utilized in accordance with this invention is comprised of a hydraulic cement, a particulate cross-linked aqueous gel having a size in the range of from about 100 to about 3,000 microns containing an internal temperature activated breaker which causes the gel to break into a liquid, a particulate dehydrated cross-linked aqueous gel having a size in the range of from about 40 to about 500 microns containing an internal temperature activated breaker which causes the gel to break into a liquid, and water present in an amount sufficient to form a slurry. After being placed in the fluid producing zone, the above described cement composition is allowed to set and the particulate cross-linked aqueous gels containing internal temperature activated breakers are allowed to break whereby a permeated set cement composition is formed in the well bore adjacent the fluid producing zone. Thereafter, the permeated set cement composition is contacted with an acid solution to dissolve any portions of the cement composition blocking the permeations.

When a lightweight permeable cement composition is required, either of the above described cement compositions can be foamed. That is, the cement compositions described above can include a gas present in an amount sufficient to form a foam and a mixture of foaming and foam stabilizing surfactants.

A variety of hydraulic cements can be utilized in the cement compositions described above. Portland cements or their equivalents are generally preferred. Portland cements of the types defined and described in *API Specification For Materials And Testing For Well Cements*, API Specification 10, 5$^{th}$ Edition, dated Jul. 1, 1990 of the American Petroleum Institute are particularly suitable. Preferred such API Portland cements include classes A, B, C, G and H with API classes G and H being more preferred, and class H being the most preferred.

The water utilized in the cement compositions is selected from the group consisting of fresh water, unsaturated salt water and saturated salt water and is generally present in the cement composition in an amount in the range of from about 20% to about 50% by weight of hydraulic cement in the composition.

As concern the particles, beads or fibers utilized in the cement compositions, when particles are used, they are generally of a size in the range of from about 40 to about 500 microns. When beads are utilized, they are generally of a size in the range of from about 40 to about 500 microns. When fibers are used, they generally have a diameter in the range of from about 5 to about 100 microns and a length from about 100 to about 100,000 microns. As mentioned, the particles, beads and fibers can be used individually or in mixtures with mixtures being preferred. The preferred acid soluble particles, beads or fibers are formed of calcium carbonate. The preferred hydrocarbon particles, beads or fibers are formed of gilsonite. The particles, beads or fibers or mixtures thereof are included in the cement compositions in an amount sufficient to permeate the cement compositions when the particles, beads or fibers are dissolved. The particles, beads or fibers or mixtures thereof are generally present in the cement compositions in an amount in the range of from about 2.5% to about 25% by weight of the hydraulic cement in the cement compositions.

The acids which can be utilized to dissolve the acid soluble particles, beads and fibers include, but are not limited to, hydrochloric acid, phosphoric acid, formic acid, citric acid and acetic acid. The acids are utilized in the form of aqueous solutions containing the acids in amounts in the range of from about 0.1% to about 10% by weight of the solutions. The hydrocarbon liquids that can be used for dissolving the hydrocarbon soluble particles, beads or fibers include, but are not limited to, xylene, toluene and other liquid aromatic hydrocarbons.

The particulate cross-linked aqueous gel having a size in the range of from about 100 to about 3,000 microns containing an internal temperature activated breaker utilized in the second hydraulic cement composition described above are comprised of water, a hydratable polymer selected from the group consisting of hydroxyalkylcellulose grafted with vinyl phosphonic acid, acrylic polymers, acrylamide polymers and polysaccharide polymers, a delayed breaker selected from the group consisting of hemicellulase, encapsulated ammonium persulfate, ammonium persulfate activated with ethanol amines and sodium chlorite, and a cross-linking agent comprised of a Bronsted-Lowry or Lewis base. The water utilized for preparing the particulate cross-linked aqueous gel is comprised of fresh water or salt water. The preferred hydratable polymer is hydroxyethylcellulose grafted with vinyl phosphonic acid, and examples of the Bronsted- Lowry or Lewis base include, but are not limited to, calcium oxide, potassium oxide, sodium hydroxide, triethanolamine and magnesium oxide. Of these, magnesium oxide is preferred.

The particular delayed internal breaker utilized in the cross-linked gel depends on the temperature of the fluid producing zone in which the cement composition is placed.

If the temperature is in the range of from about 80° F. to about 125° F., hemicellulase is utilized. If the temperature is in the range of from about 80° F. to about 250° F., encapsulated ammonium persulfate is utilized. If the temperature is in the range of from about 70° F. to about 100° F., ammonium persulfate activated with ethanol amines is used, and if the temperature is in the range of from about 140° F. to about 200° F., sodium chlorite is used.

Generally, the amount of water in the particulate cross-linked aqueous gel is in the range of from about 95% to about 99.5% by weight of the cross-linked aqueous gel, the hydratable polymer utilized is present in an amount in the range of from about 0.1% to about 5% by weight of the cross-linked aqueous gel, the internal temperature activated delayed breaker is present in an amount in the range of from about 0.05% to about 0.5% by weight of the cross-linked aqueous gel and the cross-linking agent is present in an amount in the range of from about 0.1% to about 2% by weight of the cross-linked aqueous gel.

The aqueous gel having a size in the range of from about 100 to about 3,000 microns containing an internal temperature activated breaker is prepared by mixing the water with the hydratable polymer utilized. The temperature activated delayed breaker is dissolved in water to form a concentrated solution which is then mixed with the aqueous gel. The cross-linker used is added to the aqueous gel to cross-link the aqueous gel whereby a stiff gel mass is formed. Thereafter, the cross-linked gel is extruded or sheared into particles having a size in the range of from about 100 to about 3,000 microns. The particulate cross-linked aqueous gel can be stored at ambient temperatures. When the particulate aqueous gel is exposed to the temperature which activates the delayed breaker therein, the gel breaks into a liquid and permeates the cement composition.

The dehydrated particulate cross-linked aqueous gel having a size in the range of from about 40 to about 500 microns containing an internal temperature activated breaker is produced in the same manner using the same components as described above. After the particulate cross-linked aqueous gel is formed, it is dehydrated and sieved into a dried, solid powder of reduced particle size, i.e., a size in the range of from about 40 to about 500 microns.

When the two sizes of particulate cross-linked aqueous gels containing internal temperature activated breakers are combined in the cement composition, the larger diameter gel particles are generally dispersed internally in the cement composition. The dehydrated aqueous gel particles are of a size similar to or smaller than the cement particles in the cement composition after the dehydrated particles are again hydrated, and a major portion of those gel particles find their way along with cement particles to the interface between the cement composition and the surface of the fluid producing zone. When the smaller gel particles break, they produce channels or pore spaces at the interface which are connected with the porous matrix produced by the larger size particles.

The particulate cross-linked aqueous gel particles having a size in the range of from about 100 to about 3,000 microns are included in the cement composition in an amount in the range of from about 10% to about 50% by weight of hydraulic cement therein. The particulate dehydrated cross-linked aqueous gel particles having a size in the range of from about 40 to about 500 microns are included in the cement composition in an amount in the range of from about 5% to about 30% by weight of hydraulic cement in the composition.

As indicated above, when a lightweight cement composition of this invention is required, a gas which can be air or nitrogen is included in the cement composition along with a mixture of foaming and foam stabilizing surfactants. The gas, preferably nitrogen, is generally present in an amount sufficient to foam the cement composition, i.e., an amount in the range of from about 40% to about 70% by volume of the cement composition.

As also indicated above, the permeated cement formed is contacted with an aqueous acid solution of the type and concentration described above.

While various mixtures of foaming and foam stabilizing surfactants can be included in the foamed cement composition, a preferred mixture is comprised of an ethoxylated alcohol ether sulfate surfactant of the formula

$$H(CH_2)_a(OC_2H_4)_bOSO_3NH_4^+$$

wherein a is an integer in the range of from about 6 to about 10 and b is an integer in the range of from about 3 to about 10; an alkyl or alkene amidopropylbetaine surfactant having the formula

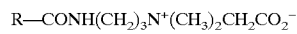

$$R\text{---}CONH(CH_2)_3N^+(CH_3)_2CH_2CO_2^-$$

wherein R is a radical selected from the group of decyl, cocoyl, lauryl, cetyl and olyl; and an alkyl or alkene amidopropyldimethylamine oxide surfactant having the formula

$$R\text{---}CONH(CH_2)_3N^+(CH_3)_2O^-$$

wherein R is a radical selected from the group of decyl, cocoyl, lauryl, cetyl and olyl. The ethoxylated alcohol ether sulfate surfactant is generally present in the mixture in an amount in the range of from about 60 to about 64 parts by weight. The alkyl or alkene amidopropylbetaine surfactant is generally present in the mixture in an amount in the range of from about 30 to about 33 parts by weight and the alkyl or alkene amidopropyldimethylamine oxide surfactant is generally present in the mixture in an amount in the range of from about 3 to about 10 parts by weight. The mixture can optionally include fresh water in an amount sufficient to dissolve the surfactants whereby they can more easily be combined with a cement slurry.

A particularly preferred surfactant mixture for use in accordance with this invention is comprised of an ethoxylated hexanol ether sulfate surfactant present in an amount of about 63.3 parts by weight of the mixture, a cocoylamidopropylbetaine surfactant present in an amount of about 31.7 parts by weight of the mixture and cocoylamidopropyldimethyl amine oxide present in an amount of about 5 parts by weight of the mixture.

The mixture of foaming and foam stabilizing surfactants utilized is generally included in the cement composition used in an amount in the range of from about 1% to about 5% by volume of water in the composition.

Another hardenable composition which cures into a hard permeable mass which can be utilized in accordance with this invention is comprised of a hardenable resin coated particulate material. Examples of the particulate material which can be utilized include glass, ceramic, bauxite and graded sand. Of these, graded sand is preferred. The hardenable resin coated on the particulate material utilized is comprised of a hardenable organic resin and a hardening agent for the resin. Examples of hardenable organic resins which can be used include, but are not limited to, polyepoxide resins, novolak resins, polyester resins, phenol-aldehyde resins, urea-aldehyde resins, furan resins, urethane resins and mixtures thereof. Of these, polyepoxide resin is preferred. The hardening agent which is preferably mixed with the hardenable organic resin functions to cause the organic resin to harden after a period of time. Examples of hardening agents which can be utilized include, but are limited to, amines such as 2-ethyl,4-methyl imidazole amides, hexachloroacetone, 1,1,3-trichlorotrifluoroacetone, benzotrichloride, benzylchloride and benzalchloride. Of these, 2-ethyl,4-methyl imidazole is preferred.

The hardenable organic resin can be coated on the particulate material utilized with the hardening agent being mixed with the resin coated particulate on-the-fly, i.e., as the resin coated particulate material is pumped into the fluid producing zone by means of a carrier fluid, or both the hardenable organic resin and hardening agent can be introduced into the carrier fluid on-the-fly. After the hardenable organic resin and hardening agent coated particulate material is placed in the fluid producing zone, it hardens into a hard permeable mass.

As mentioned above, prior to placing the hardenable composition utilized, i.e., either a cement composition or a particulate material coated with a hardenable resin composition, a perforated pipe containing a plurality of openings around and along the length of the pipe is placed in the open hole well bore adjacent to the fluid producing zone. A preferred perforated pipe is illustrated in FIG. 1 and is designated by the numeral 10. The pipe 10 includes a plurality of off-set openings 12 around the periphery thereof and extending along the length of the pipe 10. The openings 12 in the pipe allow the hardenable composition utilized to flow through the pipe and into the annulus between the pipe and the walls of the well bore without bridging inside the pipe. That is, if the inside of the pipe becomes plugged as a result of the hardenable composition bridging therein, additional hardenable composition flows through the openings in the pipe into the annulus and back into the interior of the pipe through the openings below the plug thereby assuring that the pipe as well as the space between the pipe and the walls of the well bore are completely filled with the hardenable composition.

An alternate perforated pipe 14 which is expandable and can be utilized in accordance with this invention is illustrated in FIG. 3 after it has been partially expanded by pushing or pulling a mandrel 16 therethrough. The expandable perforated pipe 14 is preferably formed of high strength ductile steel and includes a series of staggered, overlapping axial openings 15 therein. The staggered, overlapping openings 15 allow for up to about 300% radial expansion. The typical expansion required in accordance with the present invention is about 50% which causes less than about 1% overall contraction of the pipe length. After the expandable perforated pipe 14 is run into an open-hole fluid producing zone, the expanding mandrel 16 is run through the pipe 14 to expand it to the required size. As indicated, the mandrel 16 can either be pushed or pulled through the perforated pipe 14 whereby it is of a size smaller than the open hole well bore within which it is placed. When the well bore above the fluid producing zone includes casing, the expanded pipe 14 preferably is expanded to an internal diameter which is substantially the same as the internal diameter of the casing.

When the hard permeable mass within the perforated pipe 10 or the expanded perforated pipe 14 is drilled out, the pipe guides the drill bit and prevents it from side-tracking. If it is necessary to increase the size of the annulus between the perforated pipe utilized and the walls of the well bore, the diameter of the open hole producing zone can be enlarged prior to placing the perforated pipe in the fluid producing zone using a reamer, hydrojet or the like.

An alternate method of this invention for forming a permeable sand screen in a long, open hole well bore within a fluid producing zone which utilizes one of the hardenable compositions described above is comprised of the following steps. A perforated pipe assembly comprised of a perforated outer pipe containing groups of openings around the periphery thereof spaced from each other along the length of the pipe and having a smaller drillable perforated inner pipe attached within the outer pipe, preferably concentrically, is provided. The drillable perforated inner pipe includes groups of openings which are longitudinally offset from the groups of openings in the outer pipe. The perforated pipe assembly containing the drillable perforated inner pipe is placed in the open hole well bore adjacent to the fluid producing zone. The external diameter of the perforated outer pipe of the pipe assembly has an external diameter smaller than the diameter of the open hole well bore. Thereafter, a hardenable composition is provided which after being placed in a desired location cures into a hard permeable mass, and the hardenable composition is placed in the well bore adjacent to the fluid producing zone within the interior of the drillable perforated inner pipe, between the drillable perforated inner pipe and the perforated outer pipe, between the perforated outer pipe and the walls of the well bore and within voids or fractures in the producing zone. The hardenable composition is caused to cure into a hard permeable mass, and the hard permeable mass and the drillable perforated inner pipe within the interior of the perforated outer pipe are drilled out of the perforated outer pipe.

The perforated outer pipe assembly containing the smaller drillable perforated inner pipe provides more openings and passageways for the hardenable composition used to prevent and/or bypass hardenable composition bridges formed therein. Preferably, the outer and inner perforated pipes are of sizes such that approximately equal amounts of the hardenable composition flow through the drillable inner pipe and the annulus between the inner pipe and outer pipe. If bridging occurs within the inner pipe, the inner pipe is quickly back-filled by the hardenable composition flowing through the annulus between the perforated pipes and vice versa. The number and sizes of the openings in the inner and outer perforated pipes are such that the quantities of hardenable composition flowing through the inner pipe and the annulus between the inner pipe and outer pipe readily flow from the inner pipe to the outer pipe and from the outer pipe into the annulus between the outer pipe and the walls of the well bore.

As will be understood by those skilled in the art, the set cement or the hardened resin coated particulate material remaining between the perforated outer pipe and the walls of the well bore after the resin coated particulate material has been drilled out (along with the drillable perforated inner pipe utilized in the second method described above) acts as a filter to prevent formation sand and fines from migrating into the well bore with produced fluids. The rigid pipe provides high strength to the set cement composition or the hardened resin coated particulate material.

A preferred method of the present invention for forming a permeable sand screen in a long, open hole well bore within a fluid producing zone comprises the steps of: (a) placing a perforated pipe containing a plurality of openings around and along the length thereof in the open hole well bore adjacent to the fluid producing zone, the perforated pipe having an external diameter smaller than the diameter of the open hole well bore; (b) providing a hardenable composition which after being placed in a desired location cures into a hard permeable mass; (c) placing the hardenable composition in the well bore adjacent to the fluid producing zone within the interior of the perforated pipe therein, between the perforated pipe and the walls of the open hole well bore and within voids or fractures in the producing zone; (d) causing the hardenable composition to cure into a hard permeable mass; and (e) drilling the hard permeable mass out of the interior of the perforated pipe.

Another preferred method of forming a permeable sand screen in a long, open hole well bore within a fluid producing zone comprises the steps of: (a) providing a perforated pipe assembly comprised of a perforated outer pipe containing groups of openings around the periphery thereof spaced from each other along the length of the pipe and having a smaller drillable perforated inner pipe concentrically attached within the outer pipe, the drillable perforated inner pipe including groups of openings which are longitudinally offset from the groups of openings in the outer pipe; (b) placing the perforated pipe assembly in the open hole well bore adjacent to the fluid producing zone, the perforated outer pipe of the assembly having an external diameter smaller than the diameter of the open hole well bore; (c) providing a hardenable composition which after being placed in a desired location cures into a hard permeable mass; (d) placing the hardenable composition in the well bore adjacent to the fluid producing zone within the interior of the drillable perforated inner pipe, between the drillable perforated inner pipe and the perforated outer pipe, between the perforated outer pipe and the walls of the well bore and within voids or fractures in the producing zone; (e) causing the hardenable composition to cure into a hard permeable mass; and (f) drilling the hard permeable mass and the perforated inner pipe out of the interior of the perforated outer pipe.

In order to ensure that the hardenable composition is placed in all areas along the total length of the perforated pipe or pipes utilized and in the annulus between the perforated pipe or pipes and the walls of the well bore, a smaller non-perforated pipe (sometimes referred to as a wash pipe) can be inserted in the well bore and through the perforated pipe or pipes to the bottom of the well bore. The hardenable composition is then pumped through the wash pipe into the bottom of the well bore within the perforated pipe or pipes. As the hardenable composition fills the well bore and the perforated pipe or pipes, the wash pipe is slowly raised to the top of the perforated pipes to thereby ensure the hardenable composition completely fills the well bore and perforated pipes.

In order to further illustrate the methods of this invention, the following examples are given.

EXAMPLE 1

An internal breaker comprised of sodium chlorite was added to a 2% solution of a polymer of hydroxyethylcellulose grafted with vinyl phosphonic acid. The hydrated polymer was then cross-linked with magnesium oxide. The resulting cross-linked gel was graded into small pieces in a Waring blender. The particulate cross-linked gel was then added to test portions of fresh water to be used in preparing test cement slurries.

Separate quantities of API Portland Class H cement were dry blended with calcium carbonate in amounts varying from about 5% to about 10% by weight of the cement along with particulate gilsonite in an amount of 10% by weight of the cement. Test cement slurries were then prepared utilizing the test portions of water containing the above described particulate cross-linked gel in amounts such that the test cement slurries contained particulate cross-linked gel in the amount of 20% of the cement in the test slurries. The test cement slurries containing particulate cross-linked gel, particulate calcium carbonate and particulate gilsonite were mixed to a density of 15.9 pounds per gallon. Mixtures of foaming and foam stabilizing surfactants were added to the test slurries in amounts of 1% by volume of the water in the slurries. The test slurries were then foamed with air to densities of 11.2 pounds per gallon. The mixtures of foaming and foam stabilizing surfactants were comprised of an ethoxylated hexanol ether sulfate surfactant in an amount of about 63.3 parts by weight, a cocoylamidopropylbetaine surfactant present in an amount of about 31.7 parts by weight and a cocoylamidopropyldimethylamine oxide present in an amount of about 5 parts by weight. The test foamed cement slurries were then placed in an oven at 140° F. and allowed to set for 72 hours. As a result of the internal breakers in the cross-linked gels in the set foamed cement compositions, the gels reverted to liquids and formed vugs and channels in the test set cement compositions.

Each of the test set cement compositions were cored to obtain plugs having dimensions of 2 inches in length by $^{15}/_{16}$ inch in diameter. Each core was placed in a fluid loss cell equipped with a core holder and the initial permeability of the core was determined in accordance with the procedure set forth in the above mentioned API Specification 10 using an aqueous 2% by weight potassium chloride solution. Thereafter, an emulsified acid containing 50% by weight of an aqueous 5% hydrochloric acid solution and 50% by weight of an aromatic hydrocarbon solvent, i.e., xylene, was flowed through the core.

The emulsion of hydrochloric acid and xylene flowed into the vugs and channels in the core and dissolved particulate calcium carbonate and particulate gilsonite therein which created additional pathways and interconnected channels in each core. A total of two pore volumes of emulsified acid and xylene were used to dissolve the calcium carbonate and gilsonite in each core. Following the acid-xylene emulsion treatment, the final permeability of each core was determined using an aqueous 2% by weight potassium chloride solution. The compressive strength of two cores were tested for compressive strength before and after being permeated.

The quantities of components in the various test cement compositions along with the results of the permeability and compressive strength tests are set forth in Table I below.

TABLE I

Permeable Set Cement[1] Tests

| Test Core No. | Amount of Water[2], % by wt. of cement | Amount of Calcium Carbonate, % by wt. of cement | Amount of Gilsonite, % by wt. of cement | Amount of Cross-Linked Gel[3], % by wt. of cement | Initial Permeability Darcies $10^{-3}$ | Final Permeability, Darcies | Initial Compressive Strength, psi | Final Compressive Strength, psi |
|---|---|---|---|---|---|---|---|---|
| 1 | 37 | 5 | 10 | 20 | 5.4 | 32.7 | 1064 | 580 |
| 2 | 37 | 5 | 10 | 20 | 9.5 | 32 | 1060 | 575 |

TABLE I-continued

Permeable Set Cement[1] Tests

| Test Core No. | Amount of Water[2], % by wt. of cement | Amount of Calcium Carbonate, % by wt. of cement | Amount of Gilsonite, % by wt. of cement | Amount of Cross-Linked Gel[3], % by wt. of cement | Initial Permeability Darcies 10$^{-3}$ | Final Permeability, Darcies | Initial Compressive Strength, psi | Final Compressive Strength, psi |
|---|---|---|---|---|---|---|---|---|
| 3 | 37[4] | 5 | 10 | 20 | 12.4 | 1.211 | — | — |
| 4 | 37[4] | 5 | 10 | 20 | 10.1 | 0.97889 | — | — |
| 5 | 37[4] | 5 | 10 | 20 | 3.4 | 0.66 | — | — |
| 6 | 37[4] | 7.5 | 10 | 20 | 1.26 | 27.2 | — | — |
| 7 | 37[4] | 10 | 10 | 20 | 0.9 | 28 | — | — |
| 8 | 37 | 7.5 | 10 | 20 | 12.06 | 29.6 | — | — |
| 9 | 37 | 10 | 10 | 20 | 48.6 | 30.2 | — | — |

[1]Portland Class H cement
[2]Fresh water
[3]Hydroxyethylcellulose grafted with vinyl phosphonic acid cross-linked with magnesium oxide (See U.S. Pat. No. 5,363,916 issued to Himes et al.)
[4]Cement compositions were attached to ceramic cores to simulate the well formation From Table I, it can be seen that the permeability was greatly increased by the acid-xylene emulsion and that the permeable cores had adequate compressive strengths to function as sand screens in well bores. Only a portion of the gilsonite in the cores was dissolved by the two pore volumes of emulsion utilized. However, when such permeable set cement compositions are utilized in well bores, the flow of produced crude oil through the permeable cement will dissolve additional gilsonite thereby increasing the permeability of the cement.

EXAMPLE 2

A viscous carrier fluid was prepared in the laboratory by mixing deionized water containing 7% by weight potassium chloride with hydroxyethylcellulose in an amount to make an aqueous gelled solution having a concentration of 40 pounds of hydroxyethyl-cellulose per 1,000 gallons of water. The pH of the aqueous gel was adjusted to 6.5 with acetic acid and mixed for 5 minutes. Thereafter, the pH was adjusted to 12 with a sodium hydroxide solution.

Test No. 1

To a 250 milliliter sample of the above described aqueous gel, 250 grams of 20–40 mesh (U.S. Sieve Series) sand coated with a resin composition was added to the aqueous gel sample. A gel cross-linker comprised of a mixture of sodium borate and sodium hydroxide was added to the aqueous gel containing the resin coated sand and the mixture was stirred for 5 minutes. Thereafter, the mixture was heated in a water bath at 200° F. for 30 minutes with occasional stirring followed by cooling to room temperature. The mixture was then placed in a sealed bottle which was maintained at 200° F. in an oven overnight. The bottle was removed from the oven, cooled to room temperature and the compressive strength of the consolidated sand therein was determined using an Ultrasonic Cement Analyzer.

Test No. 2

The procedure of Test No. 1 was repeated in a second test except that the resin diluent utilized in the resin composition in Test No. 1 was omitted (see Table I below).

Test No. 3

The procedure of Test No. 1 was repeated a third time except that a different resin diluent was used (see Table I below).

Test No. 4

The procedure of Test No. 3 was repeated except that the ethoxylated nonyl phenol phosphate ester surfactant utilized in Test No. 3 was omitted (see Table I below).

Test No. 5

The test procedure of Test No. 4 was repeated except that the pH of the aqueous gel was lowered.

The identification of the components in the resin compositions tested, the amounts of the components and the results of Tests Nos. 1–5 are given in Table II below.

TABLE II

Compressive Strengths Of Various Resin Coated Sand Consolidations In Viscous Carrier Fluid And Without Closure Pressure

| Resin Composition Components | Resin Composition Component Amounts, % by weight of the composition | | | | |
|---|---|---|---|---|---|
| | Test 1 | Test 2 | Test 3 | Test 4 | Test 5 |
| Polyepoxide Resin[1] | 64 | 67.7 | 63.6 | 66.4 | 63.6 |
| Aromatic Hydrocarbon Resin Diluent[2] | 5.5 | — | — | — | — |
| Cyclohexane Dimethanol Resin Diluent | — | — | 6.1 | 6.4 | 6.1 |
| 2-ethyl, 4-methyl imidazole Hardening Agent | 21.7 | 23 | 21.5 | 22.5 | 21.5 |
| Surface Active Agent[3] | 4.3 | 4.5 | 4.3 | 0 | 4.3 |
| Methanol Diluent | 2.5 | 2.7 | 2.5 | 2.6 | 2.5 |
| N-2-(aminoethyl)-3-aminopropyl-trimethoxysilane | 2 | 2.1 | 2 | 2.1 | 2 |
| RESIN COATED SAND CONSOLIDATION COMPRESSIVE STRENGTH, psi | 589 | 73 | 141 | 46 | 215 |

[1]Condensation product of epichlorohydrin and bisphenol A commercially available under the trade designation "EPON-828 ™" from the Shell Chemical Co.
[2]butyl lactate
[3]ethoxylated nonyl phenol phosphate ester From Table II, it can be seen that utilizing resin compositions without a resin diluent or a different resin diluent or changing the pH of the gelled and cross-linked mixture did not improve the compressive strengths of the resin coated sand consolidations after hardening of the resins.

was substituted for the solid sorbitol temperature actuated breaker.

The identification of the components in the resin compositions tested, the amounts of the components and the results of Tests Nos. 6–11 are given in Table III below.

TABLE III

Compressive Strengths Of Various Resin Coated Sand Consolidations In Viscous Carrier Fluid And Without Closure Pressure

| Resin Composition Components | Resin Composition Component Amounts, % by weight of the composition | | | | | |
|---|---|---|---|---|---|---|
| | Test 6 | Test 7 | Test 8 | Test 9 | Test 10 | Test 11 |
| Polyepoxide Resin[1] | 61.5 | 64.2 | 66.1 | 64 | 65 | 66.1 |
| 2-ethyl,4-methyl imidazole Hardening Agent | 21.1 | 22 | 22.7 | 21.9 | 22.3 | 22.7 |
| Surface Active Agent[2] | 5.8 | 6 | 6.2 | 6 | 6.1 | 6.2 |
| Methanol Diluent | 2.4 | 2.5 | 2.6 | 2.5 | 2.6 | 2.6 |
| N-2-(aminoethyl)-3-aminopropyltrimethoxysilane | 1.9 | 2 | 2 | 2 | 2 | 2 |
| Sorbitol (70% Aqueous Solution) Temperature Activated Breaker | 7.2 | — | — | 3.7 | — | — |
| Catechol Temperature Activated Breaker | — | 3.2 | 0.3 | — | — | — |
| Sorbitol (Particulate Solid) | — | — | — | — | 2 | — |
| Mixture of Dimethyl Glutarate, Dimethyl Succinate and Dimethyl Adipate | — | — | — | — | — | 0.4 |
| RESIN COATED CONSOLIDATION COMPRESSIVE STRENGTH, psi | 1744 | 2840 | 1214 | 834 | 1093 | 1728 |

[1]Condensation product of epichlorohydrin and bisphenol A commercially available under the trade designation "EPON-828 ™" from the Shell Chemical Co.
[2]ethoxylated nonyl phenol phosphate ester

Test No. 6

The procedure described in Example 1, Test No. 1 was repeated except that the resin composition did not include a resin diluent. Instead, a temperature activated breaker comprised of a 70% aqueous solution of sorbitol was added to the resin composition.

Test No. 7

The procedure of Test No. 6 was repeated except that instead of the sorbitol temperature activated breaker, a catechol temperature activated breaker was included in the resin composition (see Table II below).

Test No. 8

The procedure of Test No. 7 was repeated except that a smaller amount of catechol was included in the resin composition (see Table II below).

Test No. 9

The procedure of Test No. 6 was repeated except that a smaller amount of the aqueous sorbitol solution was included in the resin composition (see Table II below).

Test No. 10

The procedure of Test No. 9 was repeated except that sorbitol was added to the resin composition as a solid.

Test No. 11

The procedure of Test No. 10 was repeated except that a temperature activated breaker comprised of a mixture of dimethyl glutarate, dimethyl succinate and dimethyl adipate From Table III, it can be seen that when the resin compositions included the various temperature activated breakers tested, the consolidated resin coated sand packs produced had considerably higher compressive strengths than those of Example 1.

Test No. 12

The procedure of Test No. 11 of Example 2 was repeated except that an increased quantity of the temperature activated breaker mixture was used and butyl alcohol was substituted for methanol.

Test No. 13

Test No. 13 was identical to Test No. 12 except that dimethyl glutarate dissolved in methyl alcohol was substituted for the butyl alcohol and temperature activated breaker mixture of Test No. 12 (see Table III below).

Test No. 14

Test No. 14 was identical to Test No. 13 except that dimethyl glutarate dissolved in butyl alcohol was substituted for the dimethyl glutarate dissolved in methanol (see Table III below).

Test No. 15

Test No. 15 was identical to Test No. 14 except that sorbitol was substituted for the dimethyl glutarate (see Table IV below).

The resin composition components, the amounts of the components and the results of Tests Nos. 12–15 are given in Table IV below.

TABLE IV

Compressive Strengths Of Various Resin Coated Sand Consolidations In Viscous Carrier Fluid And Without Closure Pressure

| Resin Composition Components | Resin Composition Component Amounts, % by weight of the composition | | | |
|---|---|---|---|---|
| | Test 12 | Test 13 | Test 14 | Test 15 |
| Polyepoxide Resin[1] | 62.6 | 65.6 | 62.6 | 62 |
| 2-ethyl,4-methyl imidazole Hardening Agent | 21.4 | 22.5 | 21.4 | 21.2 |
| Surface Active Agent[2] | 5.9 | 6.2 | 5.9 | 5.8 |
| Methanol Diluent | — | 2.6 | — | — |
| Butyl Alcohol Diluent | 7.2 | — | 7.2 | 7.1 |
| N-2-(aminoethyl)-3-amino-propyltrimethoxysilane | 1.9 | 2 | 1.9 | 1.9 |
| Mixture of Dimethyl Glutarate, Dimethyl Succinate and Dimethyl Adipate | 1 | — | — | — |
| Dimethyl Glutarate in Methanol | — | 1.1 | — | — |
| Dimethyl Glutarate in Butyl Alcohol | — | — | 1 | — |
| Sorbitol (Particulate Solid) | — | — | — | 1.9 |
| RESIN COATED CONSOLIDATION COMPRESSIVE STRENGTH, psi | 1547 | 1929 | 2387 | 2140 |

[1]Condensation product of epichlorohydrin and bisphenol A commercially available under the trade designation "EPON-828 ™" from the Shell Chemical Co.
[2]ethoxylated nonyl phenol phosphate ester From Table IV, it can be seen that the resin compositions of this invention tested in Tests Nos. 12–15 achieved resin coated sand consolidations of excellent compressive strengths and that the test composition which including the dimethyl glutarate and butyl alcohol temperature activated breaker (Test No. 14) achieved the best results.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of forming a permeable sand screen in a long, open hole well bore within a fluid producing zone comprising the steps of:
   (a) placing a perforated pipe containing a plurality of openings around and along the length thereof in said open hole well bore adjacent to said fluid producing zone, said perforated pipe having an external diameter smaller than the diameter of said open hole well bore;
   (b) providing a hardenable composition which after being placed in a desired location cures into a hard mass; said hardenable composition comprising a hydraulic cement composition, a particulate cross-linked aqueous gel having a size in the range of from about 100 to about 3,000 microns containing an internal temperature activated breaker, a particulate dehydrated cross-linked aqueous gel having a size in the range of from about 40 to about 500 microns containing an internal temperature activated breaker, and water present in an amount sufficient to form a slurry;
   (c) placing said hardenable composition in said well bore adjacent to said fluid producing zone within the interior of said perforated pipe therein, between said perforated pipe and the walls of said open hole well bore and within voids or fractures in said producing zone;
   (d) causing said hardenable composition to cure into a hard permeable mass;
   (e) causing said gel having a size in the range of from about 100 to about 3,000 microns and said gel having a size in the range of from about 40 to about 500 microns to break into liquid and said cured cement composition to be permeated; and
   (f) drilling said hard permeable mass out of the interior of said perforated pipe.

2. The method of claim 1 wherein said hardenable composition additionally comprises particles, beads or fibers which are soluble in acids or liquid hydrocarbons, and step (e) of said method additionally comprises contacting said cured cement composition with an aqueous acid solution or liquid hydrocarbons to thereby dissolve said particles, beads or fibers and further permeate said cement composition.

3. The method of claim 2 wherein said particles, beads or fibers are formed of acid soluble calcium carbonate.

4. The method of claim 2 wherein said particles, beads or fibers are formed of liquid hydrocarbon soluble gilsonite.

5. A method of forming a permeable sand screen in a long, open hole well bore within a fluid producing zone comprising the steps of:
   (a) placing a perforated pipe containing a plurality of openings around and along the length thereof in said open hole well bore adjacent to said fluid producing zone, said perforated pipe having an external diameter smaller than the diameter of said open hole well bore;
   (b) providing a hardenable composition which after being placed in a desired location cures into a hard mass; said hardenable composition comprising a hydraulic cement, a particulate cross-linked aqueous gel having a size in the range of from about 100 to about 3,000 microns containing an internal temperature activated breaker, a particulate dehydrated cross-linked aqueous gel having a size in the range of from about 40 to about 500 microns containing an internal temperature activated breaker, and water present in an amount sufficient to form a;
   (c) placing said hardenable composition in said well bore adjacent to said fluid producing zone within the interior of said perforated pipe therein, between said perforated pipe and the walls of said open hole well bore and within voids or fractures in said producing zone;
   (d) causing said hardenable composition to cure into a hard permeable mass;
   (e) causing said gel having a size in the range of from about 100 to about 3,000 microns and said gel having a size in the range of from about 40 to about 500 microns to break into liquid and said cured cement composition to be permeated,
   (f) contacting said cured cement composition with an aqueous acid solution to thereby dissolve any portions of said cement composition blocking permeations therein; and
   (g) drilling said hard permeable mass out of the interior of said perforated pipe.

6. The method of claim 5 wherein said particulate cross-linked aqueous gel having a size in the range of from about 100 to about 3,000 microns containing an internal temperature activated breaker is comprised of water, a hydratable polymer selected from the group consisting of hydroxyalkylcellulose grafted with vinyl phosphonic acid, acrylic polymers, acrylamide polymers and polysaccharide polymers, a delayed breaker selected from the group consisting of hemicellulase, encapsulated ammonium persulfate, ammonium persulfate activated with ethanol amines and sodium chlorite, and a cross-linking agent comprised of a Bronsted-Lowry or Lewis base.

7. The method of claim 6 wherein said hydratable polymer is hydroxyethylcellulose grafted with vinyl phosphonic acid.

8. The method of claim 6 wherein said cross-linking agent is magnesium oxide.

9. The method of claim 5 wherein said dehydrated particulate cross-linked aqueous gel having a size in the range of from about 40 to about 500 microns containing an internal temperature activated breaker is comprised of a dehydrated cross-linked aqueous gel comprised of a polymer selected from the group consisting of hydroxyalkylcellulose grafted with vinyl phosphonic acid, acrylic polymers, acrylamide polymers and polysaccharide polymers, a delayed breaker selected from the group consisting of hemicellulase, encapsulated ammonium persulfate, ammonium persulfate activated with ethanol amines and sodium chlorite, and a cross-linking agent comprised of a Bronsted-Lowry or Lewis base.

10. The method of claim 9 wherein said hydratable polymer is hydroxyethylcellulose grafted with vinyl phosphonic acid.

11. The method of claim 9 wherein said cross-linking agent is magnesium oxide.

12. A method of forming a permeable sand screen in a long, open hole well bore within a fluid producing zone comprising the steps of:
(a) placing a perforated pipe containing a plurality of openings around and along the length thereof in said open hole well bore adjacent to said fluid producing zone, said perforated pipe having an external diameter smaller than the diameter of said open hole well bore;
(b) providing a hardenable composition which cures into a hard permeable mass; said hardenable composition comprising a hardenable resin coated particulate material wherein said hardenable resin comprises a hardenable organic resin selected from the group consisting of novolak resins, polyester resins, phenol-aldehyde resins, urea-aldehyde resins, furan resins, urethane resins and mixtures thereof;
(c) placing said hydraulic cement composition in said well bore adjacent to said fluid producing zone within the interior of said perforated pipe therein, between said perforated pipe and the walls of said open hole well bore and within voids or fractures in said producing zone;
(d) allowing said hardenable composition to cure into a hard permeable mass; and
(e) drilling said hard permeable mass out of the interior of said perforated pipe.

13. The method of claim 12 wherein said particulate material is graded sand.

14. The method of claim 12 wherein said hardenable resin is further comprises a hardening agent for said resin.

15. The method of claim 14 wherein said hardening agent is selected from the group consisting of amines, amides, hexachloroacetone, 1,1,3-trichlorotrifluoroacetone, benzotrichloride, benzylchloride and benzalchloride.

16. The method of claim 1 or 12 wherein said hardenable composition is placed in said well bore adjacent to said fluid producing zone in accordance with step (c) by pumping said hardenable composition through said well bore into said fluid producing zone.

17. The method of claim 16 wherein said hardenable composition is pumped through said well bore by way of an open ended pipe string disposed therein and extending into said fluid producing zone.

18. The method of claim 17 wherein said pipe string is moved through said fluid producing zone as said hardenable composition is deposited therein.

19. The method of claim 1 or 12 wherein said perforated pipe is an expandable slotted pipe which is expanded to a desired size after being placed in said open hole well bore in accordance with step (a).

20. A method of forming a permeable sand screen in a long, open hole well bore within a fluid producing zone comprising the steps of:
(a) providing a perforated pipe assembly comprised of a pipe containing groups of openings around the periphery thereof spaced from each other along the length of said pipe and having a smaller drillable perforated inner pipe concentrically attached within said outer pipe, said drillable perforated inner pipe including groups of openings which are longitudinally offset from said groups of openings in said outer pipe;
(b) placing said perforated pipe assembly in said open hole well bore adjacent to said fluid producing zone, said perforated outer pipe of the assembly having an external diameter smaller than the diameter of said open hole well bore;
(c) providing a hardenable composition which after being placed in a desired location cures into a hard mass; said hardenable composition comprising a hydraulic cement composition, a particulate cross-linked aqueous gel having a size in the range of from about 100 to about 3,000 microns containing an internal temperature activated breaker, a particulate dehydrated cross-linked aqueous gel having a size in the range of from about 40 to about 500 microns containing an internal temperature activated breaker, and water present in an amount sufficient to form a slurry;
(d) placing said hardenable composition in said well bore adjacent to said fluid producing zone within the interior of said drillable perforated inner pipe of said pipe assembly, between said drillable perforated inner pipe and said perforated outer pipe, between said perforated outer pipe and the walls of said well bore and within voids or fractures in said producing zone;
(e) causing said hardenable composition to cure into a hard permeable mass;
(f) causing said gel having a size in the range of from about 100 to about 3,000 microns and said gel having a size in the range of from about 40 to about 500 microns to break into liquid and said cured cement composition to be permeated; and
(g) drilling said hard permeable mass and said perforated inner pipe out of the interior of said perforated outer pipe.

21. The method of claim 20 wherein said hardenable composition further comprises particles, beads or fibers which are soluble in acids or liquid hydrocarbons, and step (f) of said method additionally comprises contacting said cured cement composition with an aqueous acid solution or liquid hydrocarbons to thereby dissolve said particles, beads or fibers and further permeate said cement composition.

22. The method of claim 21 wherein said particles, beads or fibers are formed of acid soluble calcium carbonate.

23. The method of claim 21 wherein said particles, beads or fibers are formed of liquid hydrocarbon soluble gilsonite.

24. A method of forming a permeable sand screen in a long, open hole well bore within a fluid producing zone comprising the steps of:
(a) providing a perforated pipe assembly comprising a pipe containing groups of openings around the periphery thereof spaced from each other along the length of said pipe and having a smaller drillable perforated inner pipe concentrically attached within said outer pipe, said drillable perforated inner pipe including groups of openings which are longitudinally offset from said groups of openings in said outer pipe;

(b) placing said perforated pipe assembly in said open hole well bore adjacent to said fluid producing zone, said perforated outer pipe of the assembly having an external diameter smaller than the diameter of said open hole well bore;

(c) providing a hardenable composition which after being placed in a desired location cures into a hard permeable mass; said hardenable composition comprising a hydraulic cement, a particulate cross-linked aqueous gel having a size in the range of from about 100 to about 3,000 microns containing an internal temperature activated breaker, a particulate dehydrated cross-linked aqueous gel having a size in the range of from about 40 to about 500 microns containing an internal temperature activated breaker and water present in an amount sufficient to form a slurry;

(d) placing said hardenable composition in said well bore adjacent to said fluid producing zone within the interior of said drillable perforated inner pipe of said pipe assembly, between said drillable perforated inner pipe and said perforated outer pipe, between said perforated outer pipe and the walls of said well bore and within voids or fractures in said producing zone;

(e) causing said hardenable composition to cure into a hard permeable mass;

(f) causing said gel having a size in the range of from about 100 to about 3,000 microns and said gel having a size in the range of from about 40 to about 500 microns to break into liquid and said cured cement composition to be permeated; and (g) drilling said hard permeable mass and said perforated inner pipe out of the interior of said perforated outer pipe.

25. The method of claim 24 wherein said particulate cross-linked aqueous gel having a size in the range of from about 100 to about 3,000 microns containing an internal temperature activated breaker is comprised of water, a hydratable polymer selected from the group consisting of hydroxyalkylcellulose grafted with vinyl phosphonic acid, acrylic polymers, acrylamide polymers and polysaccharide polymers, a delayed breaker selected from the group consisting of hemicellulase, encapsulated ammonium persulfate, ammonium persulfate activated with ethanol amines and sodium chlorite, and a cross-linking agent comprised of a Bronsted-Lowry or Lewis base.

26. The method of claim 25 wherein said hydratable polymer is hydroxyethylcellulose grafted with vinyl phosphonic acid.

27. The method of claim 25 wherein said cross-linking agent is magnesium oxide.

28. The method of claim 24 wherein said dehydrated particulate cross-linked aqueous gel having a size in the range of from about 40 to about 500 microns containing an internal temperature activated breaker is comprised of a dehydrated cross-linked aqueous gel comprised of a polymer selected from the group consisting of hydroxyalkylcellulose grafted with vinyl phosphonic acid, acrylic polymers, acrylamide polymers and polysaccharide polymers, a delayed breaker selected from the group consisting of hemicellulase, encapsulated ammonium persulfate, ammonium persulfate activated with ethanol amines and sodium chlorite, and a cross-linking agent comprised of a Bronsted-Lowry or Lewis base.

29. The method of claim 28 wherein said hydratable polymer is hydroxyethylcellulose grafted with vinyl phosphonic acid.

30. The method of claim 28 wherein said cross-linking agent is magnesium oxide.

31. A method of forming a permeable sand screen in a long, open hole well bore within a fluid producing zone comprising the steps of:

(a) providing a perforated pipe assembly comprising a pipe containing groups of openings around the periphery thereof spaced from each other along the length of said pipe and having a smaller drillable perforated inner pipe concentrically attached within said outer pipe, said drillable perforated inner pipe including groups of openings which are longitudinally offset from said groups of openings in said outer pipe;

(b) placing said perforated pipe assembly in said open hole well bore adjacent to said fluid producing zone, said perforated outer pipe of the assembly having an external diameter smaller than the diameter of said open hole well bore;

(c) providing a hardenable composition which after being placed in a desired location cures into a hard permeable mass; said hardenable composition comprising a hardenable resin coated particulate material wherein said hardenable resin comprises a hardenable organic resin selected from the group consisting of novolak resins, polyester resins, phenol-aldehyde resins, urea-aldehyde resins, furan resins, urethane resins and mixtures thereof;

(d) placing said hardenable composition in said well bore adjacent to said fluid producing zone within the interior of said drillable perforated inner pipe of said pipe assembly, between said drillable perforated inner pipe and said perforated outer pipe, between said perforated outer pipe and the walls of said well bore and within voids or fractures in said producing zone;

(e) causing said hardenable composition to cure into a hard permeable mass; and (f) drilling said hard permeable mass and said perforated inner pipe out of the interior of said perforated outer pipe.

32. The method of claim 31 wherein said particulate material is graded sand.

33. The method of claim 31 wherein said hardenable resin further comprises a hardening agent for said resin.

34. The method of claim 33 wherein said hardening agent is selected from the group consisting of amines, amides, hexachloroacetone, 1,1,3-trichlorotrifluoroacetone, benzotrichloride, benzylchloride and benzalchloride.

35. The method of claim 20 or 31 wherein said hardenable composition is placed in said well bore adjacent to said fluid producing zone in accordance with step (c) by pumping said hardenable composition through said well bore into said fluid producing zone.

36. The method of claim 35 wherein said hardenable composition is pumped through said well bore by way of an open ended pipe string disposed therein and extending into said fluid producing zone.

37. A method of forming a permeable sand screen in a long, open hole well bore within a fluid producing zone comprising the steps of:

(a) providing a perforated pipe assembly comprising a pipe containing groups of openings around the periphery thereof spaced from each other along the length of said pipe and having a smaller drillable perforated inner pipe concentrically attached within said outer pipe, said drillable perforated inner pipe including groups of openings which are longitudinally offset from said groups of openings in said outer pipe;

(b) placing said perforated pipe assembly in said open hole well bore adjacent to said fluid producing zone, said perforated outer pipe of the assembly having an external diameter smaller than the diameter of said open hole well bore;

(c) providing a hardenable composition which after being placed in a desired location cures into a hard permeable mass;

(d) placing said hardenable composition in said well bore adjacent to said fluid producing zone within the interior of said drillable perforated inner pipe of said pipe assembly, between said drillable perforated inner pipe and said perforated outer pipe, between said perforated outer pipe and the walls of said well bore and within voids or fractures in said producing zone, by pumping said hardenable composition through said well bore into said fluid producing zone by way of an open ended pipe string disposed therein and extending into said fluid producing zone, wherein said pipe string is moved through said fluid producing zone as said hardenable composition is deposited therein;

(e) causing said hardenable composition to cure into a hard permeable mass; and (f) drilling said hard permeable mass and said perforated inner pipe out of the interior of said perforated outer pipe.

* * * * *